United States Patent [19]

Severin

[11] 4,181,768
[45] Jan. 1, 1980

[54] BODY ARMOR LAMINATE

[75] Inventor: Gerard E. Severin, Wilmington, Del.

[73] Assignee: E. I. Du Pont de Nemours and Company, Wilmington, Del.

[21] Appl. No.: 519,644

[22] Filed: Oct. 31, 1974

[51] Int. Cl.² .......................... B32B 27/04; F41H 1/02
[52] U.S. Cl. .................................... 428/252; 428/340; 428/474; 428/911
[58] Field of Search ............. 2/2.5; 89/36 A; 109/80; 428/267, 272, 287, 340, 395, 474.7, 474.9, 252, 911

[56] References Cited

U.S. PATENT DOCUMENTS

| 2,697,054 | 12/1954 | Dietz et al. .......................... 428/474 |
| 3,722,355 | 3/1973 | King . |
| 3,723,241 | 3/1973 | Rakus et al. . |

FOREIGN PATENT DOCUMENTS

| 627365 | 9/1961 | Canada . |
| 635918 | 2/1962 | Canada .................................... 428/267 |

Primary Examiner—Stephen C. Bentley

[57] ABSTRACT

A laminate useful for body armor is prepared by press laminating alternate layers of a fabric from poly-(p-phenylene terephthalamide) and 6,6 nylon film to cause bonding together of the fabric layers into a rigid composite with only minimal flow of the film polymer into the yarn bundles of the fabric layers.

2 Claims, 1 Drawing Figure

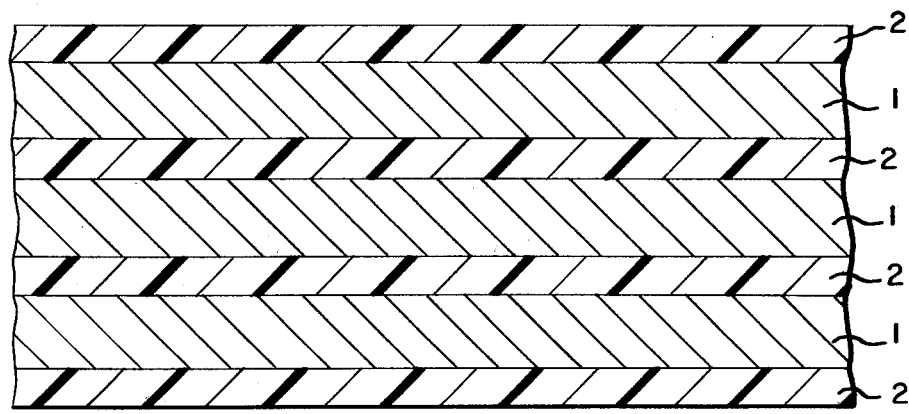

BODY ARMOR LAMINATE

BACKGROUND OF THE INVENTION

Lightweight armor material comprising fabrics such as glass impregnated with resinous materials have been proposed. Unimpregnated glass fabrics offer relatively poor ballistic protection due to fracture of the glass fibers by the projectile. When the glass fibers are encapsulated in a relatively rigid polyester matrix ballistic performance is significantly increased. The present invention provides an improved armor material which offers significantly greater ballistic protection than current materials of equal weight.

SUMMARY OF THE INVENTION

The present invention is directed to the production of a laminate useful as lightweight armor such as body armor. The laminate is prepared by consolidation with heat and pressure a plurality of fabric layers from poly(p-phenylene terephthalamide) fiber with intervening layers of 6,6 nylon film which binds the adjacent fabric layers to each other. The 6,6 nylon film constitutes from about 10 to 30% by weight of the laminate. The fabric employed in the laminate is of relatively heavy construction, from about 5 to 20 oz./yd.$^2$

DESCRIPTION OF THE DRAWINGS

The FIGURE is a magnified schematic representation of a material of the invention. Illustrated in the FIGURE are a plurality of fabric layers 1 separated by film layers 2. The film layers are comprised of 6,6 nylon, while the fabric layers are comprised of poly-(p-phenylene terephthalamide) yarns. It will be noted that the film material adheres to the yarn of the fabric but does not penetrate or encapsulate the entire yarn of the fabric. The outer layers of film in the composite are not necessary for ballistic performance, but are applied for better surface characteristics (e.g., painting or finishing).

DETAILED DESCRIPTION OF THE INVENTION

The structure of the invention is made by press laminating alternate layers of 6,6 nylon film and fabric of poly(p-phenylene terephthalamide) fiber. The conditions of temperature, pressure and time employed are sufficient to cause melting of the film and bonding of the fabric layers into a rigid composite with only minimal flow of the nylon of the film into the yarn bundles of the fabric layers. This procedure differs from current practice wherein fabric is first impregnated with a liquid polyester resin and then multiple layers are press cured to form a rigid composite.

The film is used in proportions of from 10 to 30% by weight of the composite. The thickness of the film used does not appear to be critical, providing that the desired weight per layer can be conveniently obtained and handled.

The fabrics used are normally heavy (5–20 oz./yd.$^2$) woven fabrics although nonwovens such as needle-punched felts could be used. The fabric will constitute from about 70 to 90% by weight of the laminate.

The 6,6 nylon film provides adequate adhesion to the fabric to afford integrity and has a sufficiently high melt viscosity under the temperature and pressure used that it does not totally impregnate the yarns of the fabric. The use of 6,6 nylon film at about 25° F. above its melting point has been found satisfactory at 150 psi. Other thermoplastic, high polymer films (e.g., 6-nylon, other polyamides and polyurethanes) may be used under the proper conditions. The film must provide adequate adhesion to the fabric to afford integrity and should have a sufficiently high melt viscosity under the temperature and pressure used that the binder material from the film does not totally impregnate the yarns of the fabric.

It is believed that the short beam shear yield strength is related to the binder used and the bonding conditions employed. For laminates of the invention, it should not exceed 1500 psi. and should be as low as possible consistent with the level of integrity required by the end use to which the laminate is to be applied.

TEST PROCEDURES

Areal Density

This value in pounds/square feet (lb./ft.$^2$) is obtained by dividing the weight of the laminate in pounds by the face area (i.e., parallel to the fabric plane) in square feet.

Ballistic Tests

Ballistic tests were made with 17 grain Type II bevil nosed, hardened steel, fragment simulators (missile described in MIL SPEC MIL-P-46593) fired from a caliber .22–.250 Remington 700 ADL rifle. Each shell was handloaded to permit adjustment of fragment velocity. Fragment velocity was measured immediately prior to impact with two Model 50B optical detector kits and a Model 21 chronograph (Oehler Research, Austin, Texas). Fragment velocity was adjusted by variation of the powder charge to obtain a $V_{50}$ value for the composite. The $V_{50}$ is the velocity at which there is a 50—50 probability that the target will stop the projectile. The $V_{50}$ is obtained by averaging the four highest velocities for partial penetrations and the four lowest velocities for complete penetrations. The tests were essentially in accordance with MIL-STD-662A.

Since the kinetic energy of a projectile varies with the square of the velocity, comparison of impact energies at the $V_{50}$ velocity permits a relative comparison of ballistic performance of samples which differ in weight and $V_{50}$. Impact energy in foot-pounds (ft.-lbs.) was calculated using the formula:

$$E = MV^2/2g$$

where
M = projectile weight, lbs.
V = impact velocity at $V_{50}$, ft./sec.
g = 32.16 ft./sec.$^2$ The impact energy normalized for the areal density [i.e., ft.-lbs./(lb./ft.$^2$)] can be used to compare different laminates.

Short Beam Shear Yield Strength

This value is determined on laminates using a method similar to ASTM D-2344-67 but with 0.187 inch diameter loading nose and supports, a span to specimen thickness ratio of about 4:1 but with thickness varying from the standard and with no conditioning before being tested. The short beam shear yield strength in pounds/square inch (psi) is the stress calculated at the position on the load-deflection curve where the slope of the curve starts to decrease.

EXAMPLE 1

A series of laminates are prepared from alternate layers of woven fabric and 6,6 nylon (polyhexamethylene adipamide) film. The fabrics are woven from a 1420 denier yarn containing about 1000 continuous filaments of poly-(p-phenylene terephthalamide). The yarn has the following impregnated strand properties (ASTM D-2343): tensile strength 525,000 pounds/square inch (psi), modulus $19 \times 10^6$ psi, elongation at break 2.8%. Laminate data are given in Table I.

The fabric used for the laminate identified as Item a in Table I has a basis weight of 15 ounces/square yard (oz./yd.$^2$) and is woven in a basket weave using 8 ends of yarn and 8 picks of yarn as bundles to give 40 ends of yarn per inch and 40 picks of yarn per inch. The laminate is prepared by stacking alternate layers of the fabric and 1-mil thick 6,6 nylon film (melting point ca. 500° F., relative viscosity of about 144 as measured on a solution of 5.5 grams of film in 50 ml. of 90% formic acid at 25° C.). This assembly with film on the top and bottom faces is placed in a hydraulic press which has been preheated to 525° F. and is held at 150 psi pressure for 7 minutes until the interior of the laminate reaches 525° F. as monitored by an enclosed thermocouple. The laminate is removed from the press, allowed to cool and tested for ballistic performance.

The laminate identified as Item b in Table I is prepared in a similar fashion to Item a using twelve layers (each $12 \times 12$ inches) of the fabric of Item a with 52 layers of film. Four layers of film were placed between fabric layers and on the outer sides of the top and bottom fabric layers. The laminate has a short beam shear yield strength of 254 psi.

The laminate identified as Item c in Table I is made in a manner similar to Item a but the fabric is a plain weave fabric having a basis weight of 6.8 oz./yd.$^2$, and contains 17 ends of the yarn per inch and 17 picks of the yarn per inch.

The laminate of Item d of Table I is prepared using the fabric of Item a in combination with 0.75 mil thick films of 6,6 nylon. The laminate is heated in matched metal molds at a pressure of 1000 psi. Twenty minutes is required to heat the laminate interior to 525° F.

EXAMPLE 2

This is a comparative example.

The yarn of the fibers of Example 1 are woven in a basket weave fabric having a weight of 12 oz./yd.$^2$ using 6 ends as a bundle and 6 picks as a bundle to give 30 ends per inch and 30 picks per inch. A conventional laminate is prepared by impregnating layers of the fabric with a liquid polyester resin, assembling the layers and pressing under heat to cure the laminate. Properties of the laminate are given as Item e in Table I.

EXAMPLE 3

This is a comparative example.

A woven glass yarn fabric of 22.3 oz./yd.$^2$ basis weight designed for ballistic applications is used. Layers of the fabric are impregnated with a liquid polyester resin, the layers stacked and the assembly pressed under heat to cure the laminate. Properties are given as Item f in Table I.

The procedure of Example 1 is followed with the glass fabric and 6,6 nylon film to make laminates. Properties are given as Items g and h in Table I. It is observed that the use of the film with the glass fabric gives poorer results than with the liquid polyester resin impregnant.

EXAMPLE 4

This is a comparative example.

The procedure of item b in Example 1 is followed with the substitution of the appropriate number of layers of 2-mil thick films of 6-nylon (polycaproamide) (melting point ca. 428° F., relative viscosity of 150) for the 6,6-nylon. The assembly of fabric and film is pressed at 400 psi and 525° F. for 10 minutes. The relatively poor results are given as Item i in Table I.

This laminate has a short beam shear yield strength of 1941 psi. It is believed that the poor ballistic performance and the high short beam shear yield strength is due to the excessive temperature which caused more impregnation of the yarn in the fabric than is desirable for good ballistic performance.

TABLE I

| Example | Item | NP9-25 Laminate | | | | Impact Energy @ $V_{50}$ |
|---|---|---|---|---|---|---|
| | | Binder* wt. % | Thickness inches | Density lb./ft$^2$ | $V_{50}$ ft/sec | Areal Density ft.-lbs./(lb./ft$^2$) |
| 1 | a | 16.0 | | 2.05 | 2194 | 89 |
| 1 | b | 17.0 | 0.260–0.265 | 1.55 | 1790 | 78 |
| 1 | c | 19.0 | 0.247 | 1.56 | 1767 | 76 |
| 1 | d | 25.0 | 0.242 | 1.55 | 1763 | 75 |
| 2 | e | 27.2 | 0.262 | 1.87 | 1606 | 52 |
| 3 | f | 20.0 | | 2.21 | 1626 | 45 |
| 3 | g | 14.0 | | 2.27 | 1260 | 26 |
| 3 | h | 19.0 | | 2.20 | 1245 | 27 |
| 4 | i | 20.0 | | 1.55 | 1365 | 45 |

*Film or impregnant

What is claimed is:

1. A laminate useful for body armor comprising alternate layers of a fabric woven from poly(p-phenylene terephthalamide) yarn with intervening layers of polyhexamethylene adipamide film, said fabric layers being bonded into a rigid composite by means of polymer of the film layers with only minimal presence of the film polymer in the yarn bundles of the fabric layers, the film constituting from about 10 to 30% by weight of the laminate and the fabric constituting from about 70 to 90% by weight of the laminate.

2. The laminate of claim 1 wherein the fabric has a weight of from about 5 to 20 oz./sq.yd.

* * * * *